Figure 1:
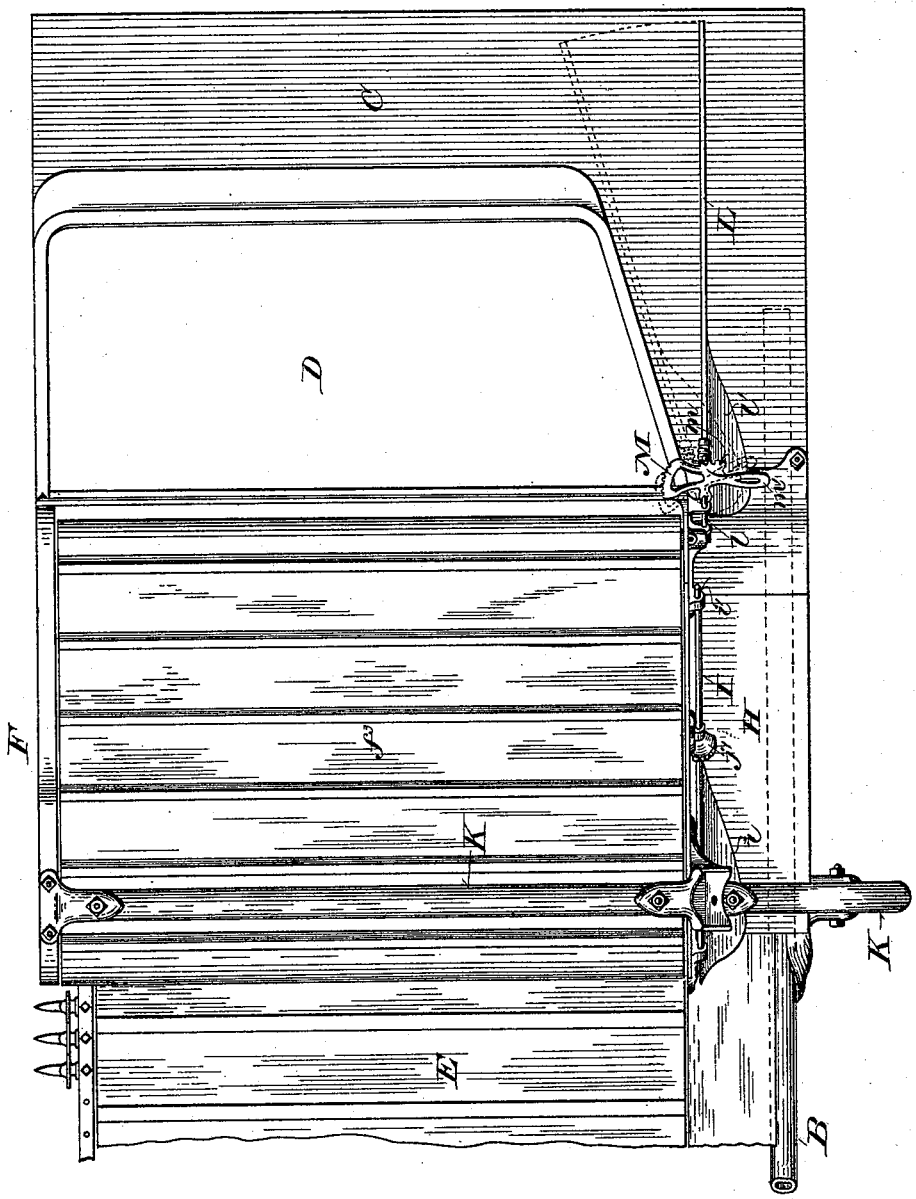

(No Model.) 6 Sheets—Sheet 3.

H. F. CRANDALL & E. J. BIRKETT.
ELEVATOR AND GRAIN GUIDE FOR HARVESTERS.

No. 582,499. Patented May 11, 1897.

Witnesses:
Chas. L. Goss.
Frank A. Krehl

Inventors:
Henry F. Crandall,
Edward J. Birkett,
By Winkler Flanders Smith Bottum &Vilas
Attorneys.

(No Model.) 6 Sheets—Sheet 4.
H. F. CRANDALL & E. J. BIRKETT.
ELEVATOR AND GRAIN GUIDE FOR HARVESTERS.
No. 582,499. Patented May 11, 1897.

Witnesses: Inventors:
Henry F. Crandall,
Edward J. Birkett,
By their Attorneys.

(No Model.) 6 Sheets—Sheet 5.
H. F. CRANDALL & E. J. BIRKETT.
ELEVATOR AND GRAIN GUIDE FOR HARVESTERS.
No. 582,499. Patented May 11, 1897.
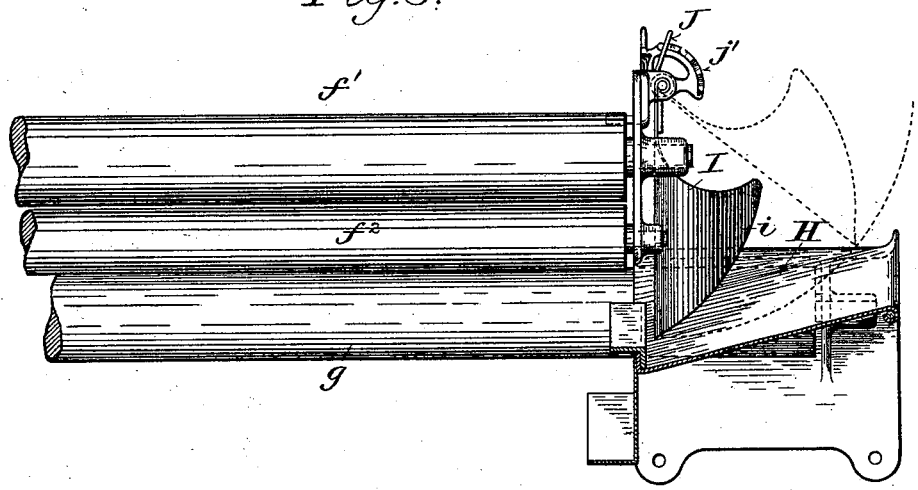
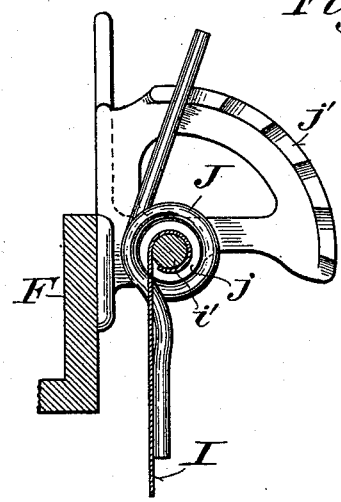
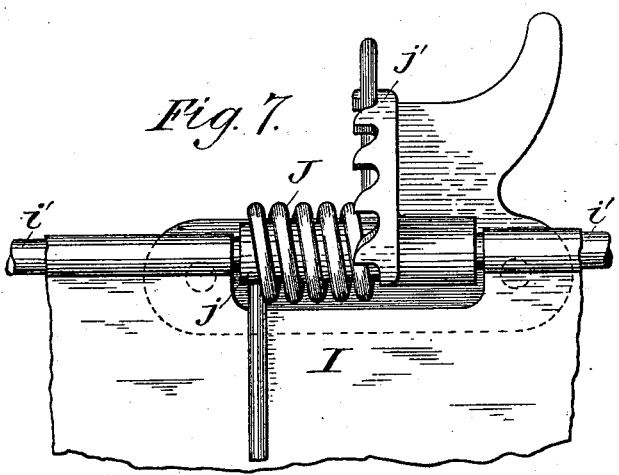

(No Model.) 6 Sheets—Sheet 6.
H. F. CRANDALL & E. J. BIRKETT.
ELEVATOR AND GRAIN GUIDE FOR HARVESTERS.
No. 582,499. Patented May 11, 1897.
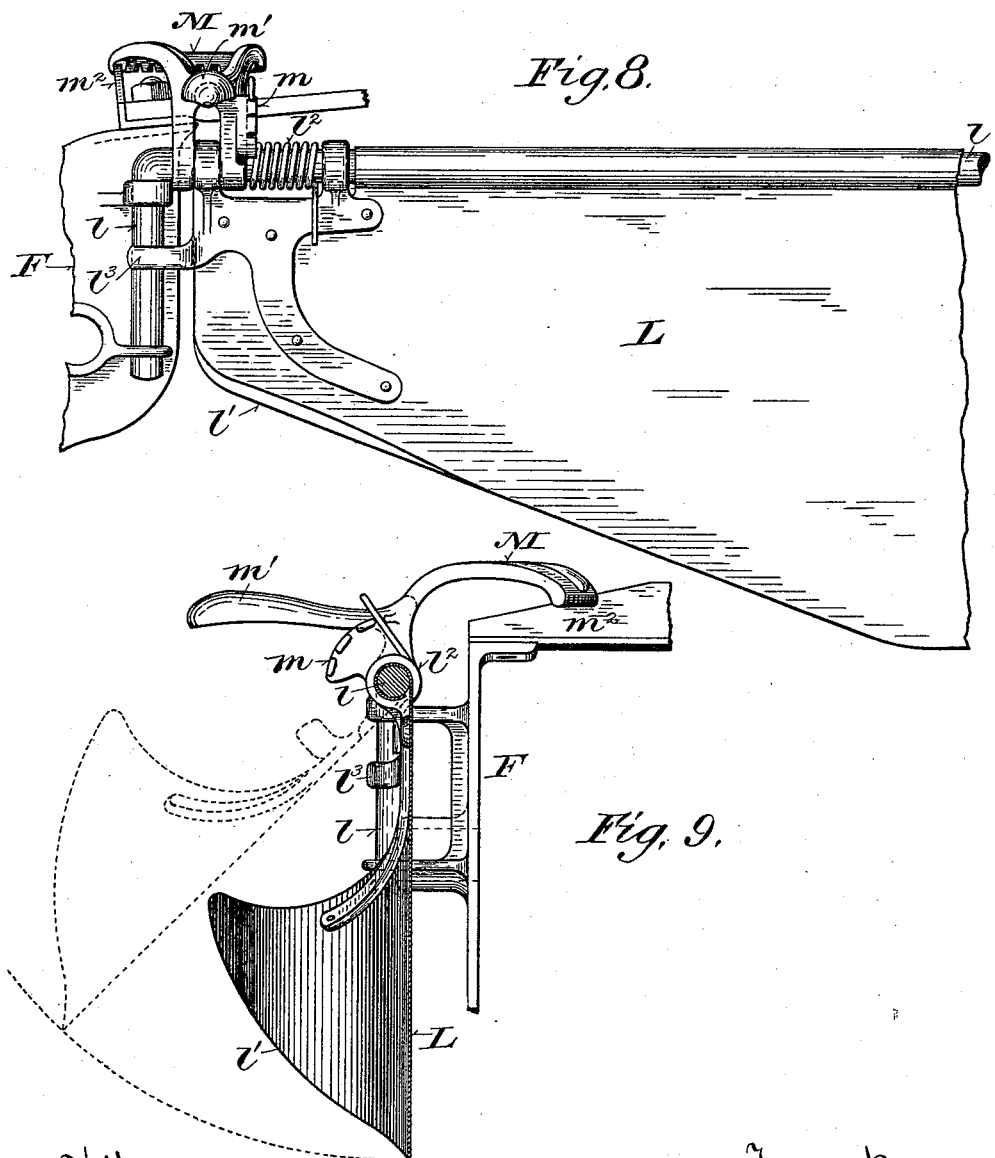

UNITED STATES PATENT OFFICE.

HENRY F. CRANDALL AND EDWARD J. BIRKETT, OF MILWAUKEE, WISCONSIN, ASSIGNORS TO THE MILWAUKEE HARVESTER COMPANY, OF SAME PLACE.

ELEVATOR AND GRAIN-GUIDE FOR HARVESTERS.

SPECIFICATION forming part of Letters Patent No. 582,499, dated May 11, 1897.

Application filed September 21, 1895. Serial No. 563,181. (No model.)

*To all whom it may concern:*

Be it known that we, HENRY F. CRANDALL and EDWARD J. BIRKETT, of Milwaukee, in the county of Milwaukee and State of Wisconsin, have invented certain new and useful Improvements in Elevators and Grain-Guides for Harvesters; and we do hereby declare that the following is a full, clear, and exact description of the invention, which will enable others skilled in the art to which it pertains to make and use the same, reference being had to the accompanying drawings, and to the letters of reference marked thereon, which form a part of this specification.

Our improvements relate particularly to the elevator and binder receptacle.

The main objects of this invention are to avoid interference with the movement of long grain through the elevator and binder receptacle and the consequent choking of the elevator thereby, to prevent scattering short grain, and to facilitate the elevation and delivery to the binding mechanism of grain varying in length.

It consists, essentially, of a door or guard applied to the rear end of the elevator-chute and constructed and arranged to be moved out of the way by the passage of long grain and to automatically close and prevent the scattering of short grain.

It consists, further, of a deflector or guide for directing the grain on the binder-deck in proper position to the binding mechanism, constructed and arranged to be swung or moved out of the way by long grain and to be automatically returned to normal position for operation upon shorter grain.

It consists, also, of a novel arrangement of the elevator-belts and rollers and certain details in the construction and arrangement of component parts of the machine hereinafter particularly described, and pointed out in the claims.

In the accompanying drawings like letters designate the same parts in the several figures.

Figure 2:
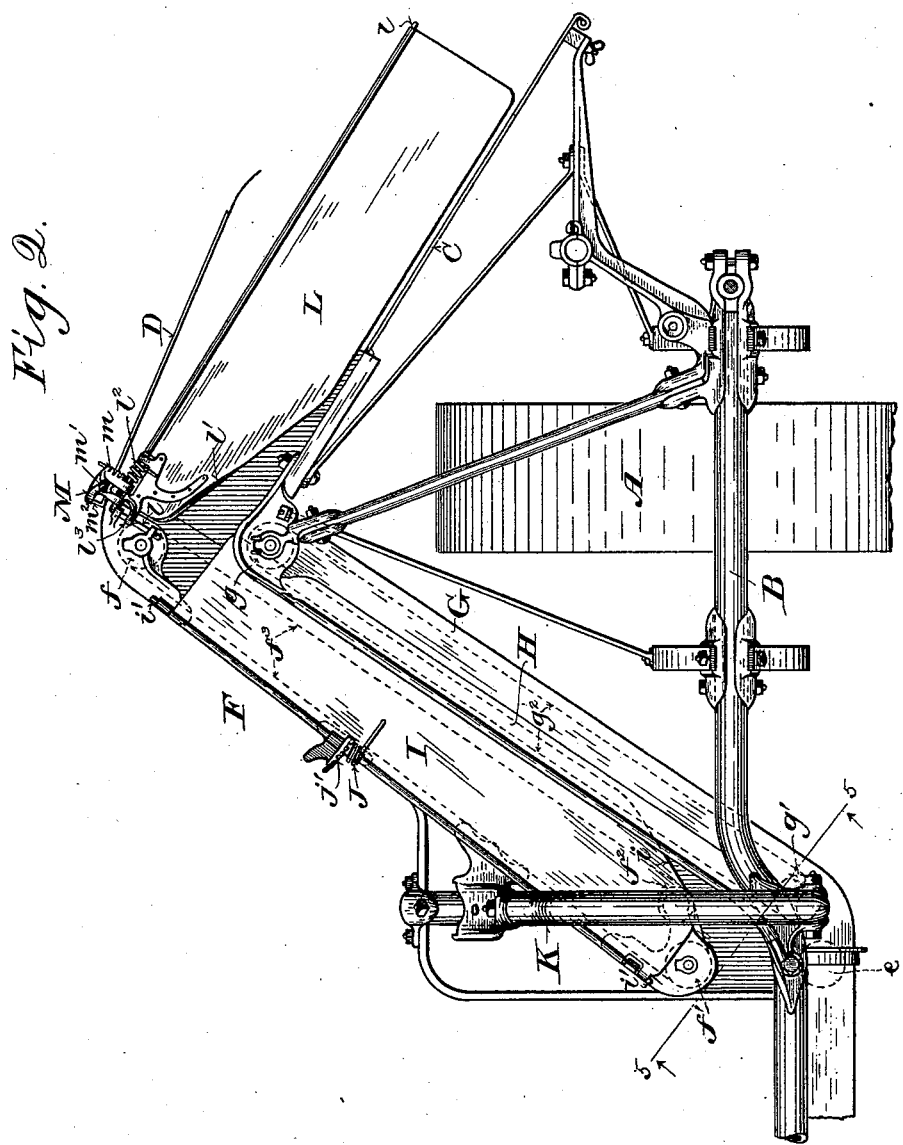
Figure 3:
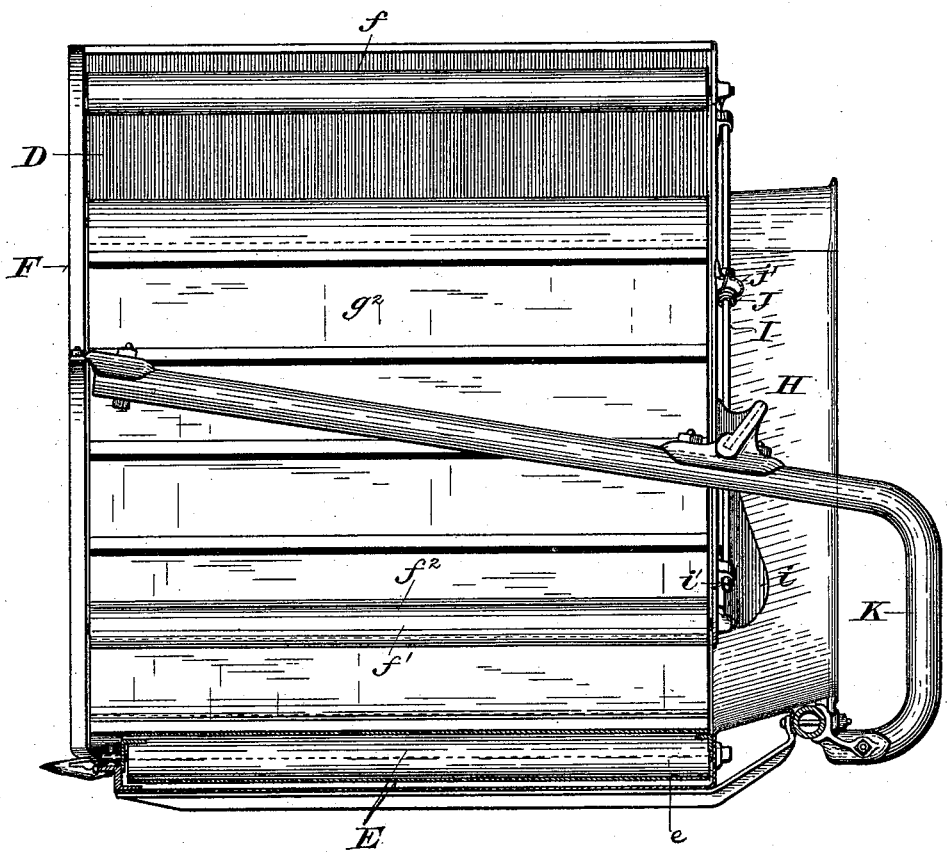
Figure 4:
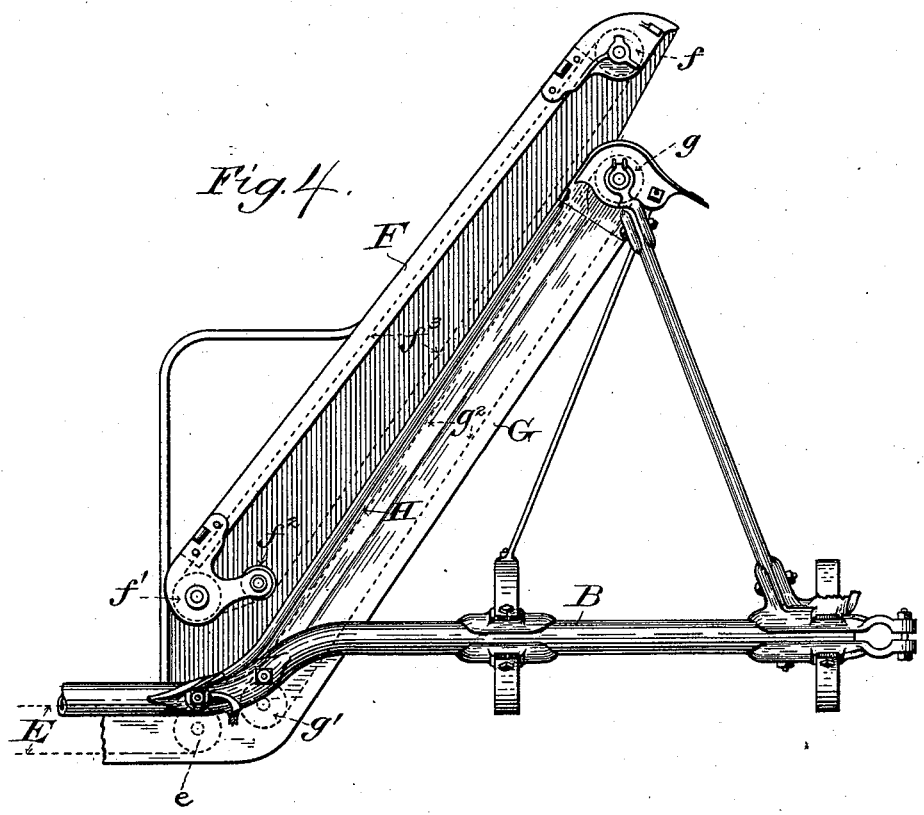

Figure 1 is a plan view of a portion of a harvester embodying our improvements, the platform being broken away and the binding mechanism removed. Fig. 2 is a rear elevation of the same. Fig. 3 is an elevation of the elevator viewed from the grain end of the machine, the platform being shown in vertical cross-section. Fig. 4 is a rear end view of the elevator, the self-closing door at its rear end and the binder being removed and the elevator-belts indicated by dotted lines. Fig. 5 is a cross-section on the line 5 5, Fig. 2, showing a portion of the elevator on an enlarged scale. Fig. 6 is an enlarged vertical cross-section of a portion of the door normally closing the opening at the rear end of the elevator, showing the spring and its attachment for closing said door. Fig. 7 is a side elevation of the parts shown in Fig. 6 as viewed from the rear of the machine. Fig. 8 is an enlarged elevation of a portion of the grain deflector or guide on the binder-deck and its connections; and Fig. 9 is a cross-section of the deflector, showing its pivot and adjusting connections as viewed from the binder end of the machine.

It has been customary heretofore in the construction of harvesters to permanently close the elevators at the rear end or to leave them entirely open and to provide the binder with a deflector placed in an upright position across the binder-deck and adapted to swing on a hinge or pivot at its upper end lengthwise of the binder and to be adjusted for guiding grain of different lengths to the binding mechanism.

In the first case mentioned, with the elevator permanently closed at the rear end, the heads of long grain are doubled backward in their upward passage, thereby frequently choking the elevator and interrupting the operation of the machine. In the second case, with the elevator constantly open at the rear end and with no deflector or guide on the binder-deck, an unobstructed passage for long grain to the binding mechanism is afforded, but short grain, which is often found in the same field with the long, is apt to be scattered and much of it wasted. To avoid these objections and to facilitate the elevation of the grain and its delivery to the binding mechanism is the design of our improvements.

Referring to Figs. 1 to 4, inclusive, A designates the main wheel, B the frame, C the binder-deck, D a guard or shield projecting over the binder-deck, and E the platform conveyer, all of the usual construction and arrangement.

F G is the elevator, consisting of the upper frame F, in which are journaled rollers $f$, $f'$, and $f^2$, carrying the belt $f^3$, and the lower frame G, in which are journaled the rollers $g$ and $g'$, carrying the belt $g^2$.

To the rear end of the lower elevator-frame G is secured a deck H, adapted to support the heads of long grain in its passage up the elevator. To the rear end of the upper frame F is hinged a door I, adapted to normally close the opening at the rear end of the elevator between the upper and lower frames and belts. At its lower end this door is turned upwardly and rearwardly, forming an inclined guiding-surface $i$, which diverges downwardly from the deck H and is adapted to be engaged by long grain entering the elevator and thereby cause such grain in its passage into and up the elevator to swing the door I rearwardly and upwardly out of the way, as indicated by dotted lines in Fig. 5.

The door I is automatically closed and held normally in that position by a spring J, (shown in detail in Figs. 6 and 7,) coiled around a sleeve $j$ of a casting, through which the hinge-rod $i'$ passes. It bears at one end against the outer side of the door I and is held at the other end in one of the notches of a sector $j'$, cast with the sleeve $j$ and attached to the upper elevator-frame F. The notched sector $j'$ affords means of adjusting the tension of spring J.

The lower end of the upper elevator-frame F is supported by a tubular bar K, attached at one end to the rear sill of the frame B, as shown in Figs. 1, 2, and 3, and formed with a rearward curve or bend, as shown in Fig. 3, to afford an unobstructed passage for the heads of long grain into the elevator.

It will be observed that the upper elevator-belt is carried upon three instead of two rollers, and that the lower roller $f'$ is located farther from the lower elevator-belt than usual, and thus produces a wider opening between the elevator-belts for the reception of grain from the platform conveyer. The intermediate roller $f^2$, located about the same distance as the upper roller $f$ from the plane of the lower belt $g^2$, guides the upper belt $f^3$ from the lower roller $f'$ toward said lower belt, which is free to yield away from it and permit the passage of any bunch or increased mass of grain that can enter the diverging opening between the belts. The upper belt $f^3$ also yields opposite the roller $g$ to permit the passage of bunches of grain, and the deflection of either belt tightens it on its carrying-rollers and causes it to act more positively.

The roller $f'$ being located above and nearly opposite the inner roller $e$ of the platform conveyer coöperates with said roller to force the grain between the elevator-belts as it is delivered thereto from said platform conveyer. By these means stout heavy grain or masses of grain which would otherwise clog and stop the elevator are taken care of with ease and certainty, and the choking and consequent interruption in the operation of the machine are avoided.

From the upper end of the elevator the grain is delivered upon the binder-deck C below the guard or shield D. As heretofore stated, it has been customary to provide the conduit thus formed with a guide hinged or pivoted at its upper end, so as to be swung at its lower end lengthwise of the binder and set in different positions across the rear end of the binder-deck for directing grain of different lengths in proper position to the binding mechanism, but when it is properly adjusted for guiding short grain to the binding mechanism it is in the way and obstructs the passage of long grain, which is frequently found in the same field with the short grain. To meet this difficulty, we have provided such a guide with a hinge or pivot connection in addition to that by which it is adjusted in the ordinary manner for grain of different lengths, whereby it may be turned out of the way by the passage of long grain.

Referring to Figs. 8 and 9 in connection with Figs. 1 and 2, L represents such a guide or deflector. It is hinged at its upper edge to a rod or bar $l$, which is bent at right angles and hinged or pivoted at its upper end by its shorter arm in ears provided therefor on the upper elevator-frame. It is turned rearwardly and upwardly on the under side of its upper end, forming an incline $l'$, diverging upwardly from the binder-deck C and presenting a flaring mouth or opening for the reception of the heads of long grain, whereby the guide or deflector is turned upwardly out of the way by the engagement therewith of such grain in its passage over the binder-deck to the binding mechanism.

The guide L is held normally in a plane perpendicular to the binder-deck by the yielding pressure of a spring $l^2$, coiled around the rod $l$ and bearing at one end against the rear side of said guide and held at the other end in one of the notches of a sector $m$, which is hinged or pivotally mounted upon said rod $l$. The sector $m$ is cast integrally or provided with a handle $m'$, projecting rearwardly from its hinge or pivot connection, and a horizontally-disposed notched sector M, projecting forwardly therefrom and adapted to engage with a ridge or projection $m^2$ on the upper elevator-frame, and thereby hold the guide L at any desired angle longitudinally to the binder-deck. The spring $l^2$ thus serves not only to hold said guide in normal position, but also to yieldingly hold the notched sector M in engagement with the projection $m^2$. The notched sector $m$, which is arranged in a plane at right angles to that of the sector M, affords means of adjusting the tension of said spring. To adjust said guide for different lengths of grain, the sector M is lifted out of engagement with the projection $m^2$ and is turned with the guide on its vertical hinge or pivot connection with the frame by means of the handle $m'$ into the desired position. The sector M being released is forced by the spring $l^2$ into engagement with the projection $m^2$, and thereby locks the parts in place. The guide L is arrested and held in a vertical position against the pressure of spring $l^2$ by a projection $l^3$ at its upper end engaging the vertical arm of rod $l$.

We do not wish to be understood as limiting ourselves to the exact details of construction herein shown and described, since various modifications thereof may be made within the spirit and intended scope of our invention.

We claim—

1. In a harvester, the combination with the elevator, of a door or movable guard normally closing the opening at its rear end, and adapted to be moved out of the way by the passage of long grain and to be automatically restored to normal position after the passage of such grain, substantially as and for the purposes set forth.

2. In a harvester, the combination with the elevator, of a door hinged to the elevator-frame above the opening at its rear end, and adapted to be automatically turned out of the way for the passage of long grain, substantially as and for the purposes set forth.

3. In a harvester, the combination with the elevator, of a door hinged to the elevator-frame above the opening at its rear end, and having an incline at the lower end whereby it is turned aside by the passage of long grain into the elevator, substantially as and for the purposes set forth.

4. In a harvester, the combination with the elevator, of a door hinged to the elevator-frame and normally closing the opening at its rear end, and a spring tending to close said door, substantially as and for the purposes set forth.

5. In a harvester, the combination with the elevator, of a door hinged to its rear end so as to normally close the opening therein and having an incline at its lower end whereby it is automatically turned aside by the passage of long grain into the elevator, a spring tending to close said door and means of adjusting the tension of said spring, substantially as and for the purposes set forth.

6. In a harvester, the combination with the binder-deck, of a rearwardly-yielding guide extending transversely over the binder-deck and hinged or pivoted to a part of the machine in a line approximately parallel with the plane of the binder-deck, and lengthwise of said guide, whereby it is adapted to be automatically turned out of the way by long grain in its passage to the binding mechanism, substantially as and for the purposes set forth.

7. In a harvester the combination with the binder-deck, of an adjustable support hinged or pivoted to a part of the machine in a line approximately perpendicular to the plane of the binder-deck, and a rearwardly-yielding guide extending transversely over the binder-deck, and hinged or pivoted to said support in a line parallel with the plane of the binder-deck and lengthwise of said guide, substantially as and for the purposes set forth.

8. In a harvester the combination with the binder-deck, of a rearwardly-yielding guide extending transversely over the binder-deck and hinged or pivoted to a part of the machine in a line approximately parallel with the plane of the deck, and lengthwise of the guide which has an incline at its upper end whereby it is turned rearwardly and upwardly out of the way by and for the passage of long grain underneath it, substantially as and for the purposes set forth.

9. In a harvester the combination with the binder-deck, of an L-shaped rod or support having one arm hinged or pivoted to a part of the machine in a line approximately perpendicular to the binder-deck, means of holding the other arm, which overhangs the binder-deck transversely, in any desired position, a guide hinged or pivoted lengthwise at or near its upper edge to the overhanging arm of said rod or support, a spring tending to hold said guide in normal position in a plane approximately perpendicular to the binder-deck, and means of adjusting the tension of said spring, substantially as and for the purposes set forth.

10. In a harvester, the combination with the frame and binder-deck, of a rod or bar having two arms at right angles to each other, the shorter arm being pivoted to the frame perpendicular to the binder-deck, a deflector or guide hinged at its upper edge to the longer arm of said rod, a spring and stop arranged to hold said guide normally in a plane perpendicular to the binder-deck, and a locking device for adjustably securing said guide at any desired angle lengthwise to the binder-deck, substantially as and for the purposes set forth.

11. In a harvester, the combination with the frame and binder-deck, of a rod or bar having two arms at right angles to each other, the shorter arm being pivoted to the frame perpendicular to the binder-deck, a deflector or guide hinged at its upper edge to the longer arm of said rod, a lever-handle pivoted upon the upper end of the longer arm of said rod and formed or provided on the opposite side thereof with a notched sector adapted to engage a projection on the frame and hold said guide at any desired angle lengthwise to the binder-deck, and a spring coiled upon said rod and engaging at one end with said lever-handle and at the opposite end with said guide so as to hold the sector in engagement with said projection and the guide in normal position with yielding pressure, substantially as and for the purposes set forth.

In testimony that we claim the foregoing as our own we affix our signatures in presence of two witnesses.

HENRY F. CRANDALL.
EDWARD J. BIRKETT.

Witnesses:
CHAS. L. GOSS,
R. C. LIVESAY.